April 26, 1927.  1,626,131
D. F. BEAUCHAMP
VEHICLE SIGNAL
Filed Nov. 7, 1925   2 Sheets-Sheet 1
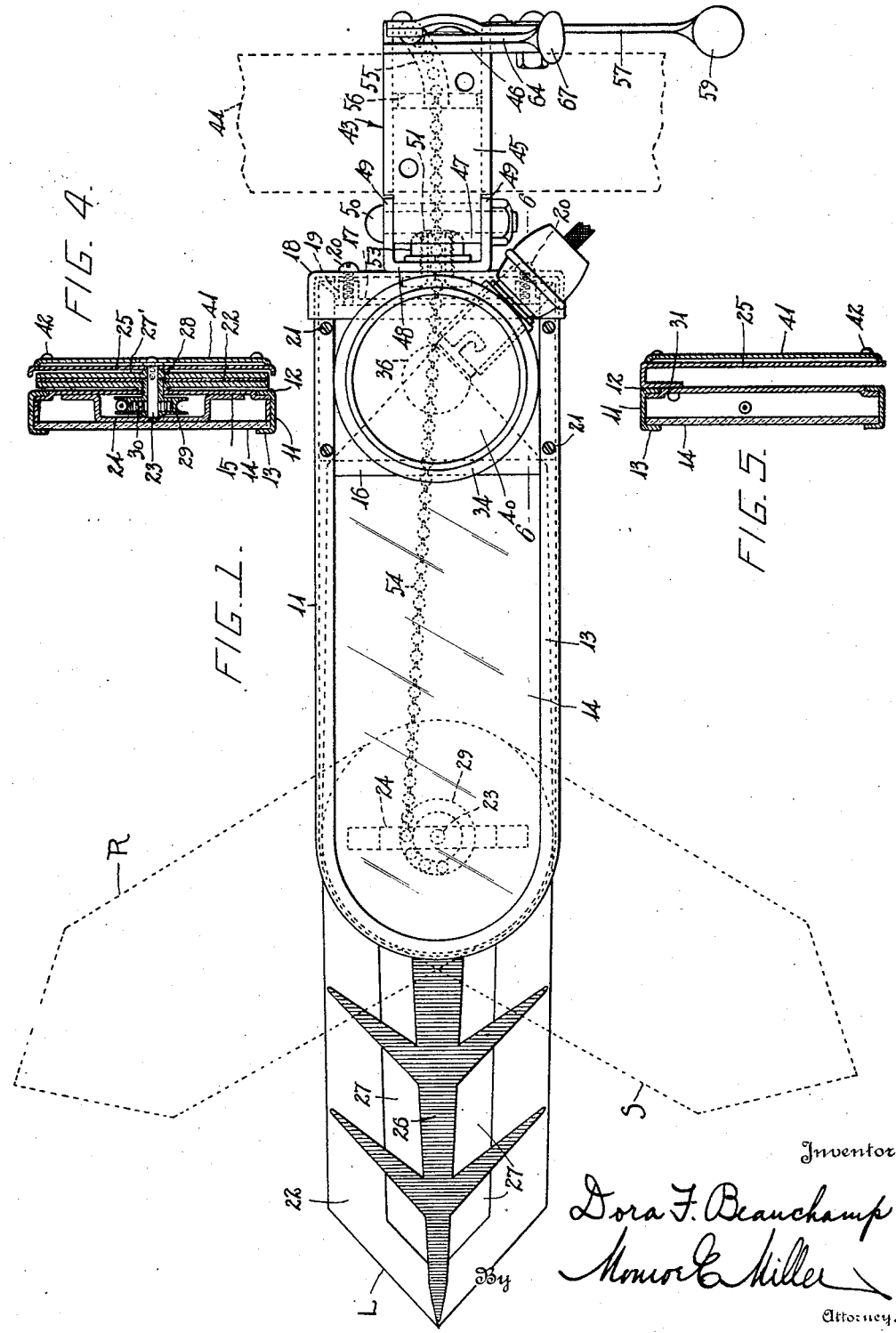
Inventor:
Dora F. Beauchamp
By Monroe E. Miller
Attorney.

April 26, 1927.
D. F. BEAUCHAMP
1,626,131
VEHICLE SIGNAL
Filed Nov. 7, 1925
2 Sheets-Sheet 2
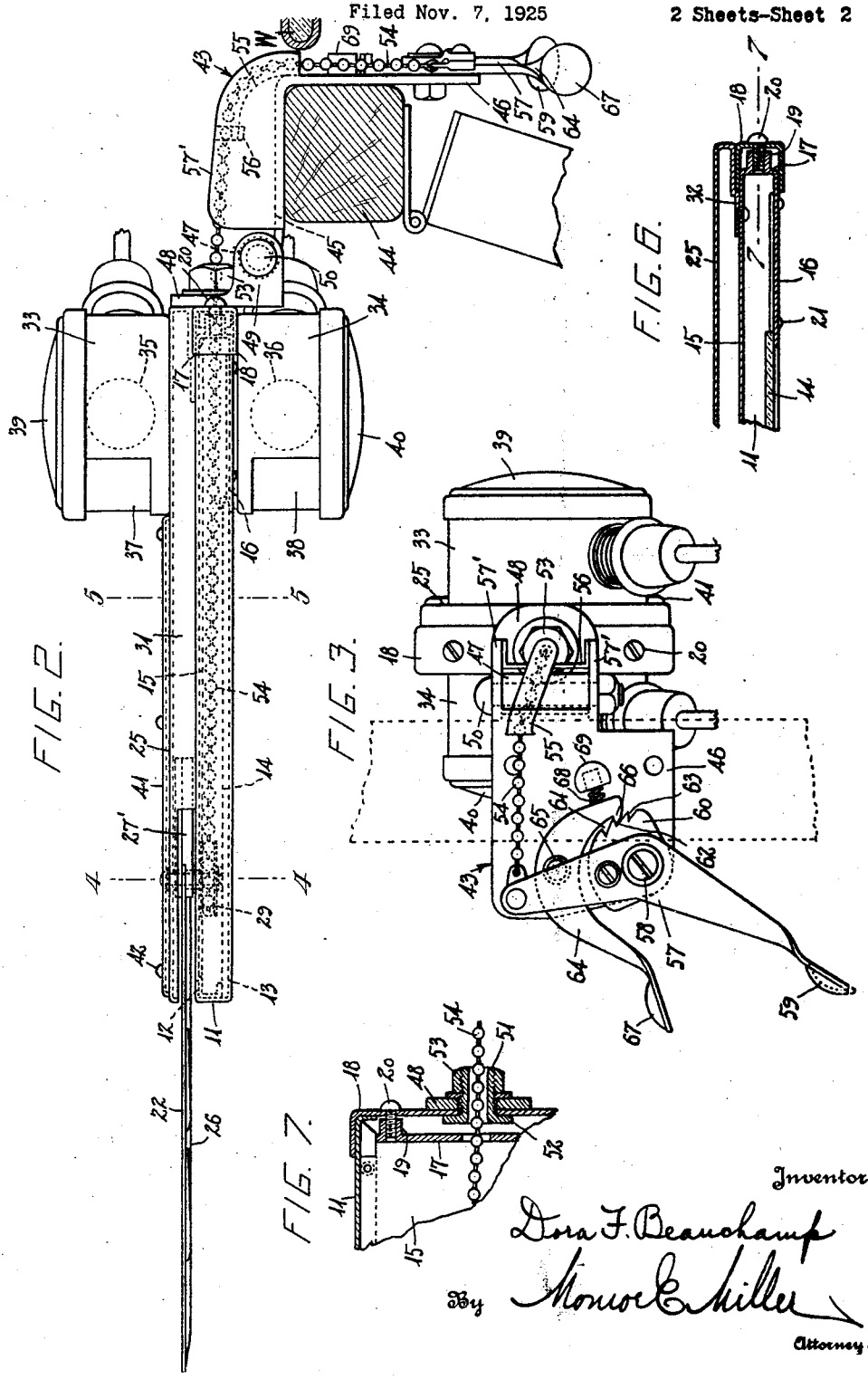
Inventor:
Dora F. Beauchamp
By Monroe E. Miller
Attorney.

Patented Apr. 26, 1927.

1,626,131

UNITED STATES PATENT OFFICE.

DORA F. BEAUCHAMP, OF FOREST HILLS, NEW YORK.

VEHICLE SIGNAL.

Application filed November 7, 1925. Serial No. 67,537.

The present invention relates to vehicle signals, and aims to provide a novel and improved signal device intended especially for use on automobiles for indicating the intentions of the driver to stop or turn.

Another object is the provision of novel means for mounting, housing and operating the signal member or arm, and to provide a novel assemblage of the component elements so that the device is practical and efficient in use.

A further object is to combine with the signal device a rear view mirror, a name or license plate, and illuminating means for lighting up the signal member or arm and also providing a parking lamp when the machine is parked or a step or running board light.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings wherein—

Figure 1 is a rear view of the device with the signal arm in one position, and showing other positions of said arm in dotted lines.

Fig. 2 is a plan view of the device.

Fig. 3 is an inner end view thereof.

Figs. 4 and 5 are cross sections on the respective lines 4—4 and 5—5 of Fig. 2.

Fig. 6 is a section on the line 6—6 of Fig. 1.

Fig. 7 is a section on the line 7—7 of Fig. 6.

The housing or case comprises a U-shaped sheet metal frame member 11 having its limbs disposed horizontally in vertically spaced relation, and said member 11 has the front and rear inturned flanges 12 and 13, respectively. A glass panel 14 is disposed within the member 11 and is held therein by the flange 13, and said panel is provided with a mirror or reflecting surface, so as to afford a rear view mirror or reflector, in order that the driver of the automobile may observe other vehicles in rear.

A partition or panel 15 of sheet metal is also disposed within the frame member 11 in overlapping relation with the flange 12, and a supplementary panel 16 of sheet metal is disposed within the open end portion of the member 11 in overlapping relation with the flange 13, the panel 16 overlapping the panel 14 and being located at the inner end of said panel or mirror 14. As shown, the plate or partition 15 and panel 16 are composed of a single piece of metal having the yoke portion 17 connecting the partition 15 and panel 16.

The ends of the frame member 11 and portion 17 are fitted within a vertically elongated cap 18 forming the inner end portion of the housing or case. The portion 17 has nuts 19 in which screws 20 are threaded, with the heads of the screws seating against the cap 18 so that the screws being tightened will draw the partition 15 and panel 16 into the cap. The panel 16 is secured to the flange 13 by means of screws 21 or otherwise, so that the frame member 11 is drawn tightly into the cap 18 by the screws 20, thus holding the parts assembled.

The signal member or arm 22 is composed of a sheet metal plate, and is mounted for rotation on an arbor 23 having one end secured to a yoke 24 disposed between the panel 14 and partition 15 and secured to said partition, the opposite end of said arbor being secured to a front plate 25 spaced in front of the partition 15, the space between the plate 25 and partition 15 accommodating the signal arm 22 when it is in normal retracted position. The signal arm is located between the partition 15 and plate 25, and has an arrow 26 pressed rearwardly therefrom and preferably colored red, the web portions of the plate having openings 27 which make the arrow more distinctive. A counter-balance weight 27' is secured to the inner end of the arm 22, so as to balance the arm and enable it to swing more freely.

The arbor 23 is located near the outer end of the housing or case, and the arm 22 is secured on the hub 28 of a drum 29 rotatable on the arbor 23 between the yoke 24 and partition 15, the hub 28 extending through the partition 15. A spiral spring 30 is located within the drum 29 and is secured to the drum and arbor in order to rotate said drum and turn the arm 22 counter-clock-wise as seen in Fig. 1, and return the signal arm into the housing.

The front plate 25 has a flange 31 along its upper edge and a flange 32 along its inner end, and said flanges are bent back and secured to the partition 15, so that the plate 25 is supported by said partition. When the arm 22 is swung upwardly into the housing it moves below and bears upwardly against the flange 31, thereby limiting the movement of said arm when retracted.

Front and rear lamp casings 33 and 34, respectively, are secured to the plate 25 and panel 16, adjacent to the inner end of the housing, and electric lamp bulbs 35 and 36 are disposed within said casings. Said casings have windows 37 and 38, respectively, facing the outer end of the housing for directing light rays against the front and rear of the housing and the signal arm when moved to signalling position. The casing 33 has a lens or glass 39 facing forwardly, while the casing 34 has a lens or glass 40 facing rearwardly, thus providing a side light for the automobile. By having the lens 39 of white or clear color and the lens 40 of red color, the two lamps may be used as a parking light when the machine is parked. The rear lamp may also serve to light the step or running board.

A name or license plate 41 is secured to the front plate 25, by means of screws 42 or otherwise, and will be illuminated by the front lamp, so as to be visible from in front of the automobile.

The housing or case carrying the mirror 14, signal arm 22, name or license plate 41 and lamps, is carried by a supporting bracket 43, which is of angular form, having the front laterally extending flange 45 and the inner rearwardly extending flange 46. Said flanges 45 and 46 are adapted to straddle the corresponding front corner post or standard 44 of the vehicle body or top. The flange 45 has its outer end bent into a sleeve 47, and an abutment member 48 has upper and lower ears 49 extending across the ends of the sleeve 47. A hinge pin or bolt 50 extends through the ears 49 and sleeve 47 to provide a hinge joint between the member 48 and bracket 43, to permit the housing or case to be adjusted forwardly and rearwardly to different angular positions when the bolt 50 is loosened. The bolt 50 clamps the ears 49 against the sleeve 47 when the bolt is tightened to maintain the adjustment. The cap 18 and flange 32 of the housing abut the member 48, and a tubular bolt 51 extends through the cap 18 and member 48 and has a flange or head 52 within the cap and a nut 53 thereon, to clamp the cap 18 and member 48 together. By loosening the nut 53 the housing or case may be turned about the horizontal axis of the bolt 51, for purpose of adjustment.

A chain or flexible element 54 extends through the bolt 51 for operating the signal arm 22, the outer terminal of the chain being secured to the drum 29 to be wound thereon when the drum is rotated to move the arm 22 into the housing. From the bolt 51 the chain 54 extends through a guide tube 55 which is curved to guide the chain around the corner of the bracket 43. The rear end of the tube 55 is soldered or otherwise secured to the flange 46 while the forward end of the tube 55 is similarly secured to a vertical brace 56 secured to and located between upper and lower flanges 57 extending forwardly from the flange 45. The flange 46 and chain 54 extend rearwardly between the post or standard 44 and the windshield W, as seen in Fig. 2, and the inner or rear end of the chain is connected to the upper arm of a lever 57 fulcrumed, as at 58, to the inner side of the flange 46. The lower arm of said lever has a finger piece 59 which when swung downwardly and forwardly will pull the chain 54 so as to rotate the drum 29 and arm 22 clock-wise as seen in Fig. 1. A ratchet plate 60 is secured to the lever 57 and has the ratchet notches 61, 62 and 63 for the engagement of a detent that holds the arm 22 in the position to which it is moved by the lever 57. The detent comprises a lever 64 fulcrumed or pivoted, as at 65, to the inner side of the flange 46 above the fulcrum 58, and said lever 64 is curved or arched so as to extend over the plate 60. The front arm of the lever 64 has a dog or pawl 66 to engage in the notches 61, 62 and 63, and the rear arm of said lever 64 has a finger piece 67 above the finger piece 59. A coiled spring 68 is confined between the front arm of the lever 64 and a stud 69 on the flange 46, to swing the dog 66 against the edge of the plate 60 which has the ratchet notches. The levers 57 and 64 are located within the corresponding front corner of the automobile body or top, so as to be conveniently operated by the driver.

The arm 22 is normally rotated into the housing by the spring 30, the finger piece 67 being pressed down to remove the dog 66 from the notches of the plate 60, so as to permit the lever 57 to swing as the chain 54 is moved outwardly in winding on the drum 29. By pressing the finger piece 59 down so that the dog 66 engages in the first notch 61, the drum 29 is rotated to swing the arm 22 downwardly and outwardly to the first signalling position, indicated at S in Fig. 1. This position of the arm may be employed to indicate that the vehicle is to be slowed down or stopped. By moving the finger piece 59 down further, so that the dog 66 engages in the second notch 62, the arm 22 is swung further to horizontal position, as indicated in full lines in Fig. 1. This position, indicated L, may be used for indicating a left hand turn. When the finger piece 59 is moved still further to engage the dog 66 in the third notch 63, the arm 22 is moved still further to an upwardly extending position, as indicated at R in Fig. 1. This position may be employed to indicate a right hand turn. In any signalling position of the arm 22, the arm is quickly returned to idle position within the housing by pressing down on the finger piece 67 to disengage the dog 66 from the ratchet plate 60. It will be noted that the finger piece 67 is located above the finger piece 59, and that the finger piece 59 will swing upwardly as the spring 30 rotates the arm 22 back into the housing. The hand may therefore be used as a cushion to retard the movement of the lever 57 while the hand is pressing the finger piece 67 down, thereby avoiding a sudden jar or shock when the arm 22 moves into the housing.

Having thus described the invention, what is claimed as new is:—

1. A device of the character described comprising a housing having a plate and a panel at opposite sides and a partition between them, the housing having an opening between the plate and partition and the space between the panel and partition being closed with the exception of an aperture, a shaft extending through said partition, a signal arm connected to said shaft and located between said plate and partition to be moved through said opening into and out of the casing, and actuating means for the signal member connected to said shaft and located between said partition and panel and extending through said aperture.

2. A device of the character described comprising a flanged frame member, a partition and panel fitted in said member, a cap fitted over one end of said member, a plate spaced from said partition and secured thereto, a signal member mounted between said partition and plate, and actuating means for said signal member located between said partition and panel and extending through said cap.

3. A device of the character described comprising a housing, a signal member mounted in the housing, a supporting member for the housing, tubular securing and pivot means connecting the housing and supporting member and permitting, when loosened, the rotary adjustment of the housing about the axis of said securing and pivot means, and actuating means extending through said securing means into the housing and operable connected with the signal member.

4. A device of the character described comprising a housing, a signal member mounted in the housing, a supporting bracket, a member hingedly connected with the supporting bracket, a tubular bolt connecting the housing and the second-named member for the adjustment of the housing about the axis of said bolt, a flexible element extending through said bolt into the housing and operably connected with said signal member, and guiding means for said flexible element carried by the bracket.

In testimony whereof I hereunto affix my signature.

DORA F. BEAUCHAMP.